United States Patent
Ke et al.

(10) Patent No.: US 8,599,570 B2
(45) Date of Patent: Dec. 3, 2013

(54) ELECTRONIC DEVICE CAPABLE OF ADJUSTING ORIENTATION OF DISPLAY CONTENT IN RESPONSE TO ROTATION OF A SUPPORT

(75) Inventors: Jui-Lin Ke, New Taipei (TW); Huai-Long Wang, Shenzhen (CN); Kai Zong, Shenzhen (CN); Jian Liu, Shenzhen (CN); Xiao-Lan Yan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 13/330,538

(22) Filed: Dec. 19, 2011

(65) Prior Publication Data
US 2013/0107473 A1 May 2, 2013

(30) Foreign Application Priority Data
Oct. 28, 2011 (CN) .......................... 2011 1 0333528

(51) Int. Cl.
- *H05K 5/00* (2006.01)
- *A47G 1/16* (2006.01)
- *A47G 29/00* (2006.01)

(52) U.S. Cl.
USPC ............................ 361/755; 40/747; 248/371

(58) Field of Classification Search
None
See application file for complete search history.

(56) References Cited

U.S. PATENT DOCUMENTS

| | | | |
|---|---|---|---|
| 6,189,842 B1 * | 2/2001 | Bergeron Gull et al. | 248/125.1 |
| 6,801,426 B2 * | 10/2004 | Ichimura | 361/679.06 |
| 7,623,181 B2 * | 11/2009 | Ibaraki | 348/373 |
| 7,744,055 B2 * | 6/2010 | Zeng et al. | 248/447 |
| 7,770,862 B2 * | 8/2010 | Chen | 248/351 |
| 7,836,623 B2 * | 11/2010 | Wang et al. | 40/747 |
| 8,094,244 B2 * | 1/2012 | Sawai et al. | 348/836 |
| 8,152,113 B2 * | 4/2012 | Chen et al. | 248/150 |
| 8,226,054 B2 * | 7/2012 | Chen et al. | 248/127 |
| D687,441 S * | 8/2013 | Janzen | D14/447 |
| 2002/0053629 A1 * | 5/2002 | Hokugoh | 248/371 |
| 2006/0118686 A1 * | 6/2006 | Hsieh et al. | 248/276.1 |
| 2008/0016742 A1 * | 1/2008 | Hao | 40/753 |
| 2008/0054150 A1 * | 3/2008 | Stuby | 248/371 |
| 2008/0297438 A1 * | 12/2008 | Lin | 345/30 |
| 2009/0184941 A1 * | 7/2009 | Liao et al. | 345/175 |
| 2009/0223102 A1 * | 9/2009 | Li et al. | 40/763 |
| 2010/0012809 A1 * | 1/2010 | Zeng et al. | 248/351 |

* cited by examiner

*Primary Examiner* — Jinhee Lee
*Assistant Examiner* — Xanthia C Cunningham
(74) *Attorney, Agent, or Firm* — Altis & Wispro Law Group, Inc.

(57) ABSTRACT

An electronic device includes a front frame, a back cover, a support stand rotatably connected to the back cover, a display panel and a circuit board. The display panel and the circuit board are fixed between the front frame and the back cover. The circuit board includes a first contact and a number of second contacts. The second contacts surround the first contact. The support includes a central shaft and a third contact. The central shaft is electrically connected to the first contact. The third contact rotates with the rotation of the central shaft to contact each of the second contacts. The circuit board includes a circuit and a processor. The electric circuit generates different signals when the first contact is connected different second contacts. The processor adjusts an orientation of display content on the display panel to rotate based on the signal.

9 Claims, 4 Drawing Sheets

ELECTRONIC DEVICE CAPABLE OF ADJUSTING ORIENTATION OF DISPLAY CONTENT IN RESPONSE TO ROTATION OF A SUPPORT

BACKGROUND

1. Technical Field

The present disclosure relates to electronic devices with a rotatable support, especially to an electronic device capable of adjusting orientation of display content in response to rotation of a support.

2. Description of Related Art

Portable electronic devices such as digital photo frames usually include a rotatable support, thus the digital photo frame can be supported in different angles. Generally, angle snap toggles are used to adapt the rotation of the support adjusting the orientation of the display content on the digital photo frame. What is needed is a new structure capable of automatically adjusting orientation of display content for the electronic devices.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
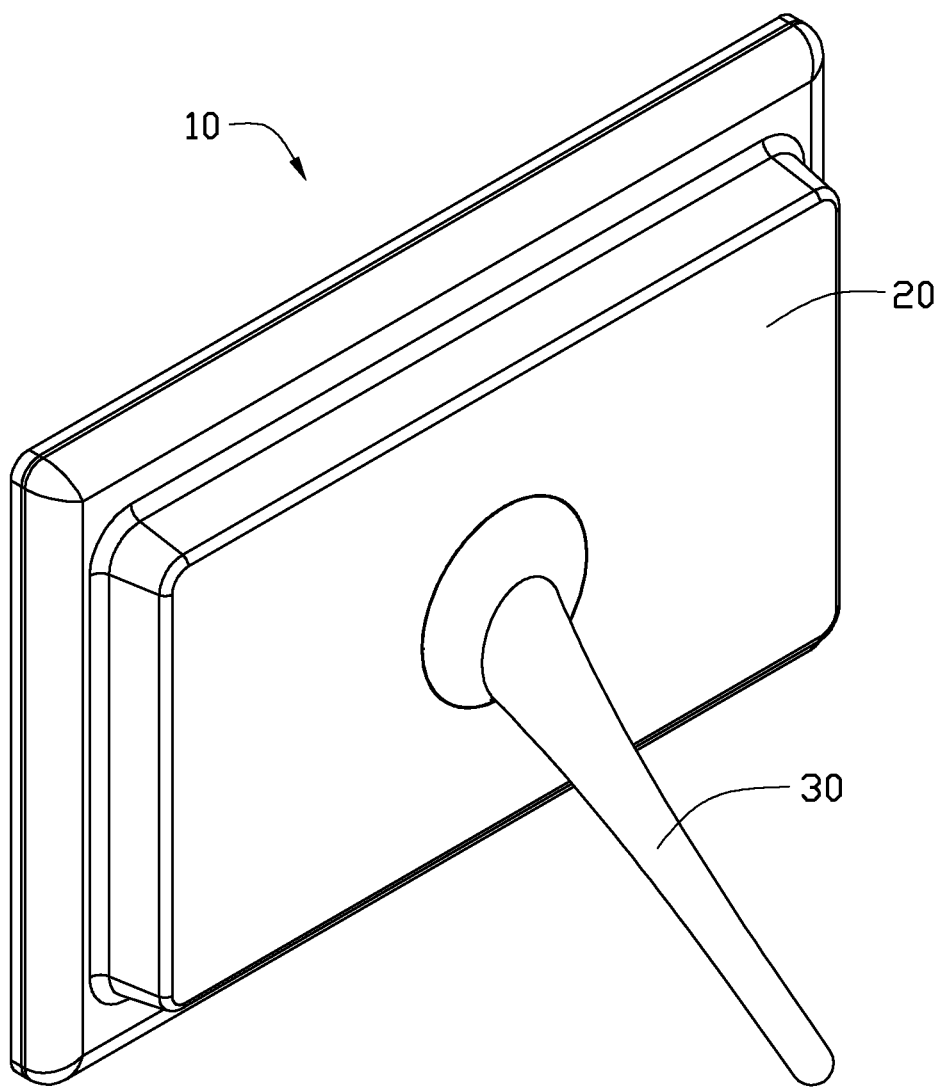
FIG. 1 is an isometric view of an electronic device according to an exemplary embodiment.
Figure 2:
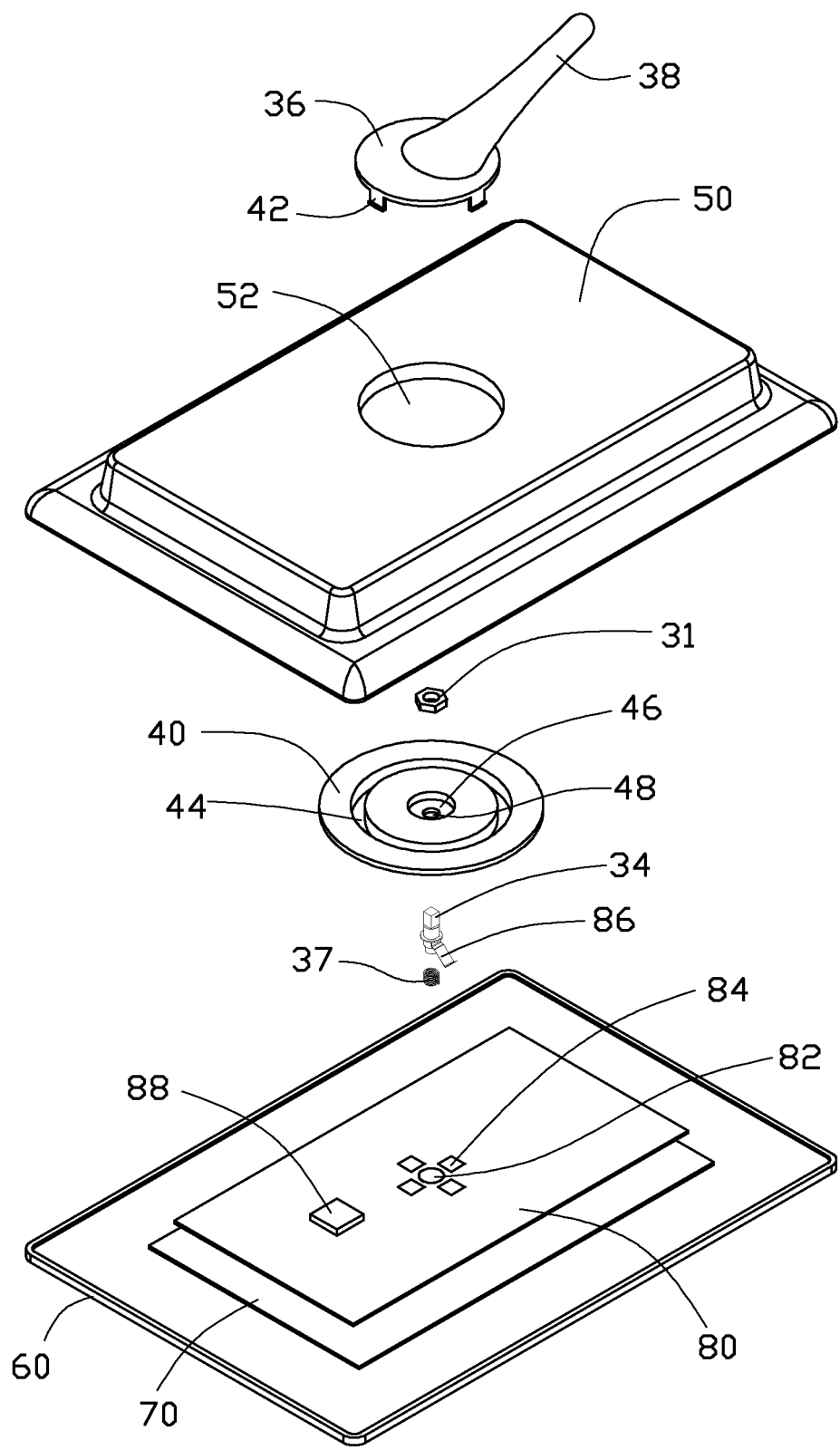
FIG. 2 is an exploded view of the electronic device of FIG. 1.
Figure 3:
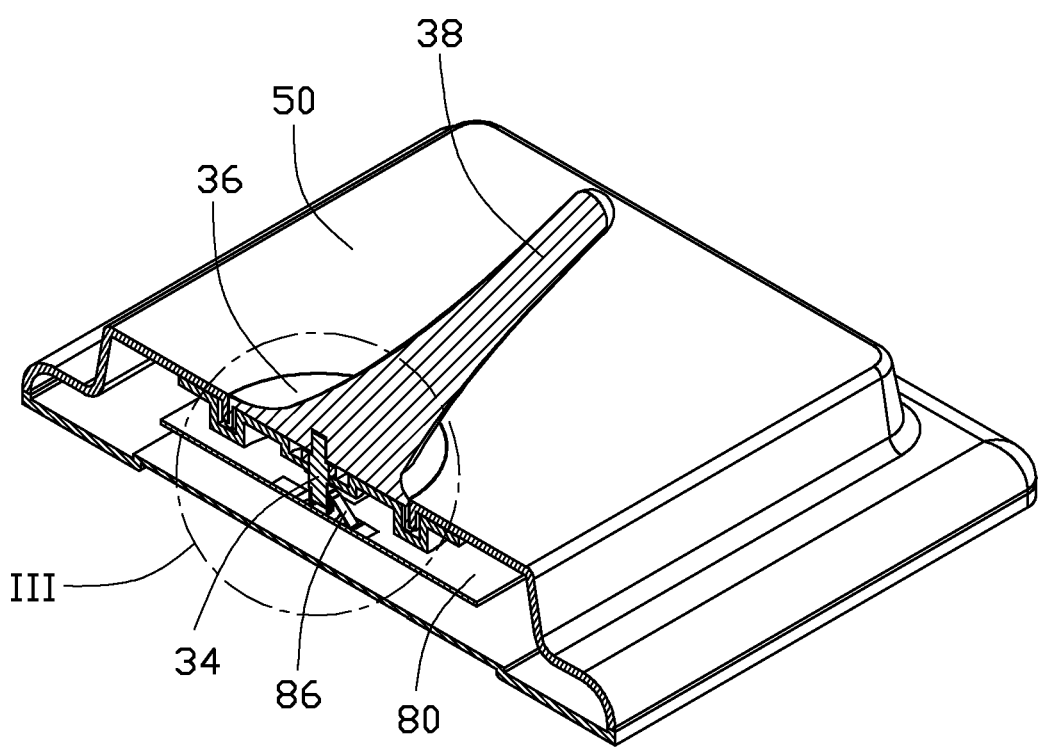
FIG. 3 is a cross-sectional view of the electronic device of FIG. 1.

Referring to FIGS. 1 and 2, an electronic device 10 according to an exemplary embodiment includes a display 20 and a support stand 30. The display 20 includes a back cover 50, a front frame fixed to the back cover 50, a display panel 70 and a circuit board 80. The display panel 70 and the circuit board 80 are fixed between the front frame 60 and the back cover 80. The support stand 30 is mounted to the back cover 50 and is rotatable relative the back cover 50. The support stand 30 is secured in different orientations so as to support the display panel 70 oriented in respective different orientations.

The circuit board 80 includes a first contact 82 and a number of second contacts 84. The second contacts 84 surround the first contact 82. In the exemplary embodiment, the first contact 82 and the second contacts 84 are all copper foil. The number of the second contacts 84 is four, and the second contacts are arranged on an imaginary circle.

Figure 4:
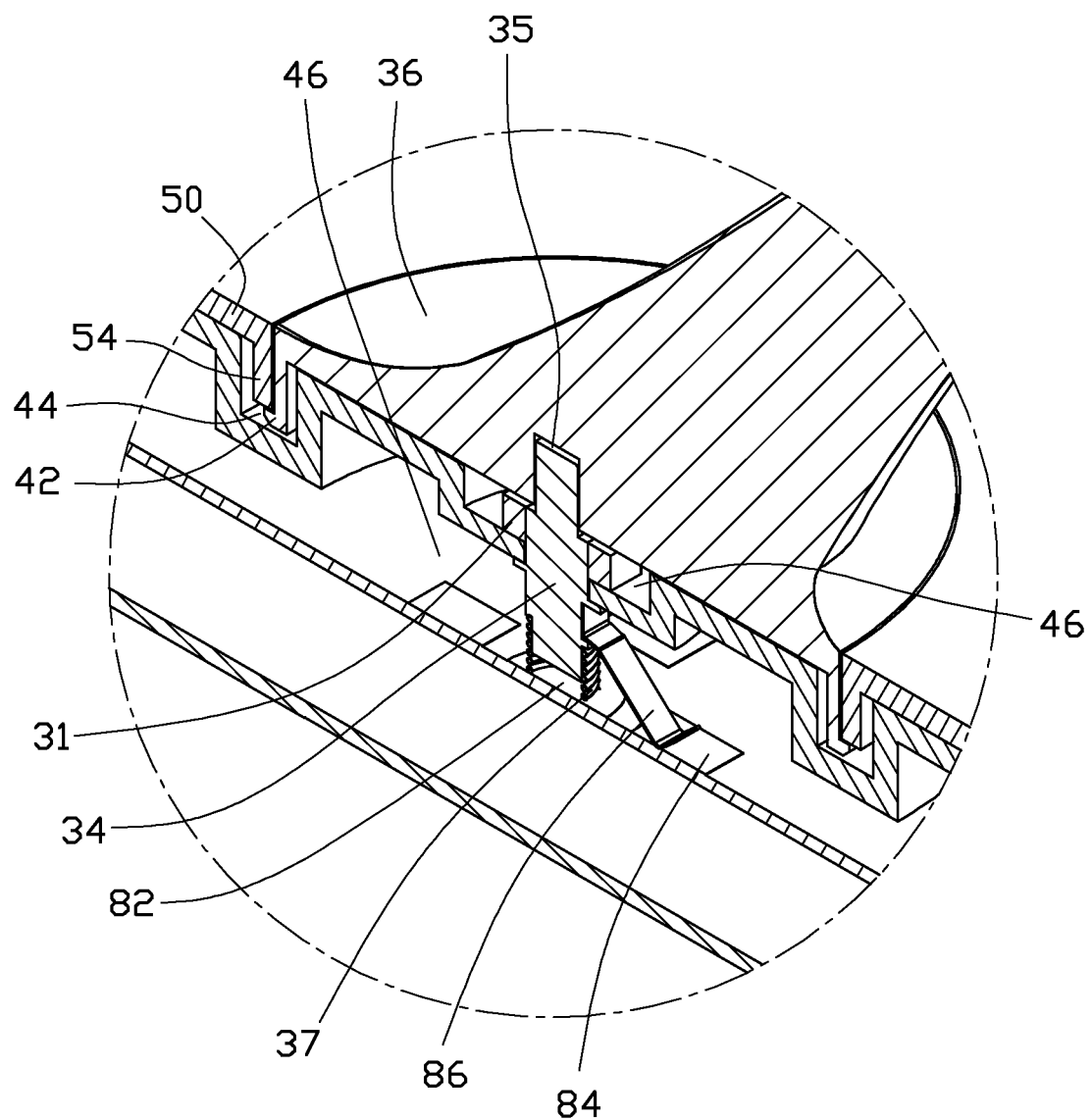
FIG. 4 is an enlarged view of the circled portion III of FIG. 3.

Referring to FIGS. 2 and 4, the support stand 30 includes a central shaft 34. The central shaft 34 is perpendicular to the back cover 50. The central shaft 34 is conductive and electrically connected to the first contact 82. In the exemplary embodiment, a coil spring 37 surrounds the central shaft 34 and abuts against the first contact 82, thereby electrically connecting the first contact 82 and the central shaft 34. In an alternative exemplary embodiment, the central shaft 34 may directly contact the first contact 82.

A third contact 86 is fixed to the central shaft 34. The third contact 86 is jointly rotatable with the central shaft 34 and can contact each of the second contacts 84 when the support stand 30 is secured in the corresponding orientations, allowing the first contact 82 to be electrically connected to the corresponding second contact 84. In the exemplary embodiment, the third contact 86 obliquely extends outward from the central shaft 34.

A circuit of the circuit board 80 generates different signals when the first contact 82 is connected to different second contacts 84. In the exemplary embodiment, each second contact 84 has a different resistance, the first contact 82 is connected to a positive electrode of a power supply, and all the second contacts 84 are connected to a negative electrode of the power supply. Thereby when the first contact 82 is connected to different second contacts 84, the circuit outputs different current signals accordingly.

The circuit board 80 further includes a processor 80. The processor 80 determines the orientation of the display panel 70 according to the signal generated by the circuit and adjusts the orientation of display content on the display panel 70. Thus, no matter what orientation the display panel 70 is in, the display content on the display panel 70 can always be upright, which is convenient for a user.

The back cover 50 defines an opening 52 and includes a protrusion 54 extending inwardly from the edge of the opening 52. The support 30 further includes a supporting leg (not labeled) and a fixing portion 40. The supporting leg includes a connection portion 36 and a support portion 38 obliquely protruding from the connection portion 36. The connection portion 36 is ring-shaped and rotatably received in the opening 52. The connection portion 36 includes a number of hooks 42 protruding from an inner side thereof. The fixing portion 40 is substantially disc-shaped and defines an annular groove 44, a central hole 46 and a through hole 48 defined in the bottom of the central hole 46. The protrusion 54 and the hooks 42 are received in the annular groove 44. The hooks 42 clasp the protrusion 54. The fixing portion 40 is fixed to the inner side of the back cover 50. The connection portion 36 is thus retained in the groove 44.

The connection portion 36 defines a receiving hole 35. The central shaft 34 extends through the through hole 48 and the central hole 35 and is partly received in the receiving hole 35 in an interference fit manner, allowing the central shaft 34 to jointly rotate with the supporting leg. A nut 31 is sleeved on the central shaft 34 and rests on the bottom of the central hole 46, thus the central shaft 34 is tightly fixed.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device comprising:
    a front frame;
    a back cover fixed to the front frame;
    a display panel fixed between the front frame and the back cover;
    a circuit board fixed between the front frame and the back cover, the circuit board comprising a first contact and a plurality of second contacts surrounding the first contact; and a support stand mounted to the back cover, the support stand being rotatable relative to the back cover and secured in different orientations so as to support the display panel oriented in respective different orientations, the support stand comprising a central shaft electrically connected to the first contact, a third contact fixed to the central shaft, and a supporting leg coupled to the central shaft, the third contact being jointly rotatable with the central shaft so as to be connectable to each of the second contacts when the support stand is secured in the corresponding orientations;

wherein the circuit board comprises a circuit and a processor, the circuit is configured to generate different signals when the first contact is connected to different second contacts, and the processor is configured to adjust an orientation of display content on the display panel based on the signal generated by the circuit.

2. The electronic device of claim 1, wherein the number of the second contacts is four, and the second contacts are arranged on an imaginary circle.

3. The electronic device of claim 1, wherein the supporting leg is jointly rotatable with the central shaft.

4. The electronic device of claim 1, wherein the central shaft is perpendicular to the back cover.

5. The electronic device of claim 1, further comprising a coil springsurrounding the central shaft and abutting against the first contact.

6. The electronic device of claim 1, wherein the third contact obliquely extends outward from the central shaft.

7. The electronic device of claim 1, wherein each second contact has a different resistance, the first contact is connected to a positive electrode of a power supply, and all the second contact are connected to a negative electrode of the power supply.

8. The electronic device of claim 1, wherein the support leg comprises a connection portion rotatably connected to the back cover, the central shaft is fixed to the connection portion.

9. The electronic device of claim 8, wherein the back cover defines an opening, the back cover comprises a protrusion extending inwardly from the edge of the opening, the connection portion is ring-shaped and rotatably received in the opening, the connection portion comprises a plurality of hooks protruding from an inner side thereof, the support further comprises a fixing portion, the fixing portion defines an annular groove, the protrusion and the hooks are received in the annular groove, the hooks clasp the protrusion and the fixing portion is fixed to the inner side of the back cover.

* * * * *